(12) United States Patent
Taoka et al.

(10) Patent No.: US 9,789,404 B2
(45) Date of Patent: Oct. 17, 2017

(54) GAME SYSTEM, CONTROLLING METHOD AND NON TRANSITORY COMPUTER-READABLE STORAGE MEDIUM FOR GAME SYSTEM

(71) Applicant: Capcom Co., Ltd., Osaka (JP)

(72) Inventors: Jirou Taoka, Osaka (JP); Atsushi Fukushima, Osaka (JP); Hideaki Moine, Osaka (JP)

(73) Assignee: CAPCOM CO., LTD., Osaka-shi, Osaka (JP)

( * ) Notice: Subject to any disclaimer, the term of this patent is extended or adjusted under 35 U.S.C. 154(b) by 210 days.

(21) Appl. No.: 14/431,470

(22) PCT Filed: Sep. 20, 2013

(86) PCT No.: PCT/JP2013/005591
§ 371 (c)(1),
(2) Date: Mar. 26, 2015

(87) PCT Pub. No.: WO2014/050061
PCT Pub. Date: Apr. 3, 2014

(65) Prior Publication Data
US 2015/0238864 A1    Aug. 27, 2015

(30) Foreign Application Priority Data

Sep. 27, 2012    (JP) ................... 2012-214415

(51) Int. Cl.
*A63F 9/24*       (2006.01)
*A63F 13/00*      (2014.01)
(Continued)

(52) U.S. Cl.
CPC ............ *A63F 13/67* (2014.09); *A63F 13/795* (2014.09)

(58) Field of Classification Search
CPC ............................... A63F 13/67; A63F 13/795
(Continued)

(56) References Cited

FOREIGN PATENT DOCUMENTS

| JP | 2004-160059 A | 6/2004 |
|----|---------------|--------|
| JP | 2009-165562 A | 7/2009 |
| JP | 2011-92623 A  | 5/2011 |

OTHER PUBLICATIONS

Sid Meier, "Civilization 5," released Sep. 21, 2010, instruction manual.*

(Continued)

*Primary Examiner* — Kevin Y Kim
(74) *Attorney, Agent, or Firm* — IP Business Solutions, LLC (57) ABSTRACT

There are provided a game system, and a controlling method and a readable storage medium for a game system increasing opportunity of matching a plurality of users in a virtual game space. Present invention has a game control module (41), a difficulty setting module (42), and a participation accepting module (43). The game control module (41) generates the virtual game space, progresses the game, and controls actions of characters acting correspondingly to the operation input by at least one of users joining a session. The difficulty setting module (42) sets a difficulty of the game based on a first character. The participation accepting module (43) accepts a request from a second user for joining the game, wherein the participation accepting module allows the second user to join the session, and wherein the second user operates a second character whose difficulty is different from the difficulty set for first character.

6 Claims, 4 Drawing Sheets

(51) Int. Cl.
   *G06F 17/00*   (2006.01)
   *G06F 19/00*   (2011.01)
   *A63F 13/67*   (2014.01)
   *A63F 13/795*  (2014.01)

(58) Field of Classification Search
   USPC .......................................................... 463/42
   See application file for complete search history.

(56) References Cited

OTHER PUBLICATIONS

Swmaniac, "How is AI difficulty level determined in Multiplayer?" Jun. 2, 2011, https://forums.civfanatics.com/threads/how-is-ai-difficulty-level-determined-in-multiplayer.425343/.*

Giantbomb.com, "Aggro," Mar. 4, 2013, http://web.archive.org/web/20130304214546/http://www.giantbomb.com/aggro/3015-105/.*

StackExchange.com, "What happens when two players play the same game at different difficulties?" Jun. 8, 2011, http://gaming.stackexchange.com/questions/24080/what-happens-when-two-players-play-the-same-game-at-different-difficulties.*

English Abstract and Machine Translation for JP2011-92623, Publication Date: May 12, 2011.

English Abstract and Machine Translation for JP2004-160059, Publication Date: Jun. 10, 2004.

English Abstract and Machine Translation for JP2009-165562, Publication Date: Jul. 30, 2009.

Shaiya, Online Game, Sugoi Koryaku Yatte masu., vol. 18, Sep. 9, 2007, pp. 152 to 155.

International Search Report dated Dec. 24, 2013 issued in corresponding PCT/JP2013/005591 application (pp. 1-2).

* cited by examiner

GAME SYSTEM, CONTROLLING METHOD AND NON TRANSITORY COMPUTER-READABLE STORAGE MEDIUM FOR GAME SYSTEM

FIELD OF THE INVENTION

This invention relates to a game system controlling actions of characters in a virtual game space, a controlling method of the game system thereof, and a non-transitory computer-readable storage medium thereof.

BACKGROUND OF THE INVENTION

Video games such as action games and role-playing games make characters act in a virtual game space correspondingly to operation input by users. In such games non-player characters, for example enemy characters attacking a player character, appear in addition to the player character. Actions of the non-player characters are not operable directly by user's input. And the non-player characters are controlled to make act accordingly to the predetermined rules in the virtual game space.

For example, in the game progressed with fighting against enemy characters, it may be known such configurations as setting difficulty of the game before the game starts. For example, the difficulty is set so that parameters of a non-player character, such as attack value, defense value, dodge, way of attacking, experience point, and/or drop item obtained when the non-player character has been broken-down, can be changed. Therefore, the higher the difficulty is set, the more difficult the game becomes. Consequently, when the difficulty is set the higher, the higher technic is required.

Also game systems such that the plurality of users is able to join the game in the virtual game space via network may be known. For example, patent literature 1 shows game systems that some of the users are handicapped if there is a technical gap among the users when the plurality of users plays a match. In such game systems, users can enjoy playing game regardless of the technic.

PRIOR ART

Patent Literature 1: Japanese Laid-Open Patent Application Publication No. 2009-165562

SUMMARY OF THE INVENTION

Technical Problem

However, only the users setting the same difficulty can join the same game in such games that the plurality of users joins the same virtual game space following a predetermined scenario. Especially in the game that non-player characters are made to appear as enemy characters. For example, a host player sets difficulty of the game. Then, only a guest player having accepted the difficulty can take part in the game. Therefore, each user joining the same game must play the game with the same difficulty. When the user searches other users through network, there are few users playable in the same difficulty at certain time of a day. So, in some cases, it is hard to make a match for users.

Thus the present invention provides a game system, a controlling method of the game system thereof, and a non-transitory computer-readable storage medium thereof, that are increasing opportunity of matching a plurality of users in a virtual game space that the plurality of users can join the same game.

Solution of Problem

One embodiment of the present invention relates to game system comprising: a game control module for generating a virtual game space in the game that each character operated by a plurality of users joining a session achieves predetermined objectives in the same virtual game space, and progressing the game by making a first character act correspondingly to operation input by a first user who is at least one of users joining the same session; a difficulty setting module for setting a difficulty of the game corresponding to the first character operated by the first user before the game starts; and a participation accepting module for accepting a request from a second user different from the first user for joining the game; wherein the participation accepting module allows the second user to join the session, and wherein the second user operates a second character whose difficulty is different from the difficulty set for the first character operated by the first user.

Effect of the Invention

The present invention increases opportunity of matching a plurality of users in the game that the plurality of users can join the same game.

BRIEF DESCRIPTION OF THE DRAWINGS

FIG. 3 is a flowchart illustrating a process for participation to a session according to one embodiment of.

DESCRIPTION OF EMBODIMENTS

One embodiment of the present invention relates to game system comprising: a game control module for generating a virtual game space in the game that each character operated by a plurality of users joining a session achieves predetermined objectives in the same virtual game space, and progressing the game by making a first character act correspondingly to operation input by a first user who is at least one of users joining the same session; a difficulty setting module for setting a difficulty of the game corresponding to the first character operated by the first user before the game starts; and a participation accepting module for accepting a request from a second user different from the first user for joining the game; wherein the participation accepting module allows the second user to join the session, and wherein the second user operates a second character whose difficulty is different from the difficulty set for the first character operated by the first user.

One embodiment of the present invention relates to game system further comprising: a communication module for sending and receiving data so as to synchronize the game among a plurality of computers operated by the plurality of users joining the game; wherein the participation accepting module allows the second user operating a second computer to join the session.

One embodiment of the present invention relates to game system comprising: a non-player character control module for controlling actions of non-player characters acting against characters operated by each user in the virtual game space; wherein the non-player character control module sets a target character chosen from a plurality of characters corresponding to the plurality of users in the middle of the game and changes parameters of the non-player characters based on the difficulty set for the target character.

One embodiment of the present invention relates to game system comprising: the game control module for setting parameters of a plurality of characters corresponding to the plurality of users joining the session based on the difficulty set for each character.

One embodiment of the present invention relates to A method of controlling a game system comprising: the step of game control for generating a virtual game space in the game that each character operated by a plurality of users joining a session achieves predetermined objectives in the same virtual game space, and progressing the game by making a first character act correspondingly to operation input by a first user who is at least one of users joining the same session; the step of difficulty setting for setting a difficulty of the game to the first character operated by the first user before the game starts; and
the step of participation accepting for accepting a request from a second user different from the first user for joining the game; wherein the step of participation accepting allows the second user to join the session, and wherein the second user operates a second character whose difficulty is different from the difficulty set for the first character operated by the first user.

One embodiment of the present invention relates to A non-transitory computer-readable storage medium storing a program for causing a computer to execute a process, comprising: the step of game control for generating a virtual game space in the game that each character operated by a plurality of users joining a session achieves predetermined objectives in the same virtual game space, and progressing the game by making a first character act correspondingly to operation input by a first user who is at least one of users joining the same session; the step of difficulty setting for setting a difficulty of the game to the first character operated by the first user before the game starts; and the step of participation accepting for accepting a request of a second user different from the first user for joining the game; wherein the step of participation accepting allows the second user to join the session, and wherein the second user operates a second character whose difficulty is different from the difficulty set for the first character operated by the first user.

Hereinafter it will be described that a game system, a controlling method of the game system thereof, and a non-transitory computer-readable storage medium thereof according to one embodiment of the present invention with reference to the drawings relate the present invention.

Configuration of the Game

As one embodiment of the present invention, action games executed on a home video game console will be described below. The action games relating to one embodiment of the present invention are progressed by searching items and/or completing predetermined missions while operating the player character and fighting against enemy characters in the virtual game space. It is disclosed specifically in multiplayer games progressed by a plurality of player characters corresponding to the plurality of users fighting against enemies cooperatively together.

In one embodiment of the present invention, in the game, the scenario (main game) having predetermined missions (objectives) is progressed by users operating player characters. The scenario includes one or a plurality of stages. When the scenario includes the plurality of stages, stages to play are changed correspondingly to progress of the scenario. And conditions for completion are set for the plurality of stages individually.

Before the main game or each stage starts, a matching process that a user joins the session created by a host player is executed. When the user joins the session, the user progresses the main game cooperatively with the host player as a guest player. In the matching process during the scenario before the stage starts, only users having completed the last stage may create a session or join the session.

On each stage configuring the main game, enemy character impede the player character to progress. In multiplayer games, each player character joining the session progresses the scenario while attacking and defeating the enemy character cooperatively.

Hardware Configuration

Figure 1:
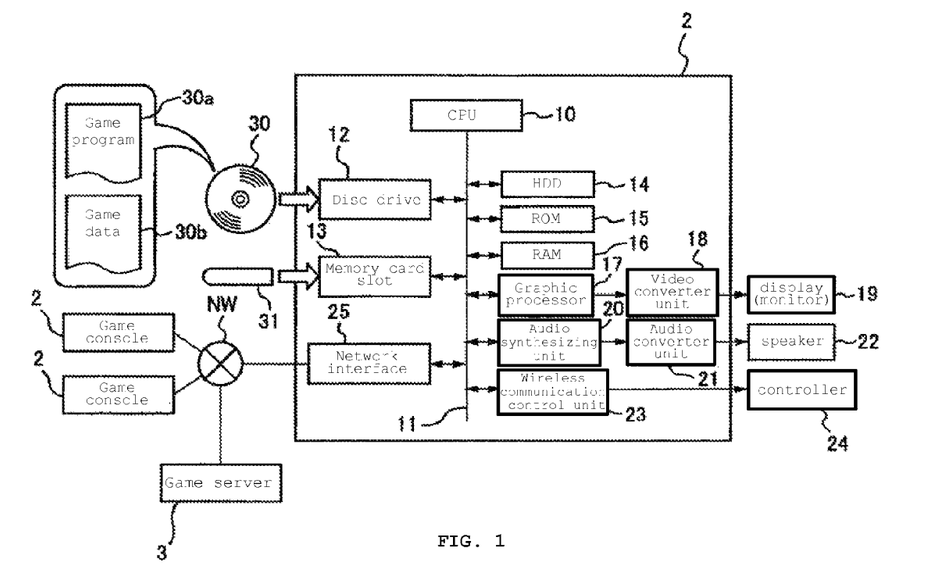
FIG. 1 is a block diagram of hardware configuration of a game console according to one embodiment of the present invention.

A game system according to the present invention includes a game console (computer device) 2 described below and external devices such as a monitor 19, a speaker 22, and a controller 24. The game system executes the game based on a game program 30a and a game data 30b loaded from a disc-type storage medium 30 described below. FIG. 1 is a block diagram of hardware configuration of a game console 2 according to the present invention. As illustrated in FIG. 1, the game console 2 is mutually communicable between the game console 2 and a game server 3 via a communication network (NW) such as internet or Local Area Network (LAN). The game console 2 includes a Central Processing Unit (CPU) 10 that is a computer controlling its operation. The CPU 10 is coupled to a disc drive 12 and a memory card slot 13, and a Hard Disk Drive (HDD) 14, a Read Only Memory (ROM) 15, and a Random Access Memory (RAM) 16 that are means for storing program via a bus 11.

The disc-type storage medium 30 such as a DVD-ROM can be loaded to the disc drive 12. The game program 30a and the game data 30b relating to the present invention are recorded to the disc-type storage medium 30. The game data 30b includes such as characters on the game according to the present invention, and objects and texture constructing the virtual game space. A card-type non-transitory storage medium 31 can be loaded to the card-type memory card slot 13. The card-type non-transitory storage medium 31 stores save data including play status such as progress of the game accordingly to commands from the CPU 10.

The HDD 14 is a mass storage medium contained in the game console 2. The HDD 14 stores the game program 30a and the game data 30b loaded from the disc-type non-transitory storage medium 30, save data etc. The ROM 15 is a semiconductor memory such as a mask ROM or a Programmable Read Only Memory (PROM). On the ROM 15, such programs booting up the game console 2 and controlling operations when the disc-type storage medium 30 is loaded are stored. The RAM 16 includes a Dynamic Random Access Memory (DRAM), or a Static Random Access Memory (SRAM), etc. On the RAM 16, the game program 30a to be executed by CPU 10, the game data 30b required executing the program 30a, etc. are loaded from the disc-type storage medium 30 or the HDD 14 correspondingly to the play status in the game and temporarily stored.

The CPU 10 is connected to a graphic processor 17, an audio synthesizing unit 20, a wireless communication control unit 23, and a network interface 25 via the bus 11.

The graphic processor 17 generates game graphics including the game space and characters accordingly to commands from the CPU 10. The graphic processor 17 is connected to a video converter unit 18. And, the graphic processor 17 is also connected to an external display (monitor) 19 via the video converter unit 18. The game graphics generated in the graphic processor 17 are converted to motion picture format in the video converter unit 18 and displayed on the monitor 19

The audio synthesizing unit 20 plays and synthesizes a digital game sound accordingly to commands from the CPU 10. The audio synthesizing unit 20 is connected to an audio converter unit 21. And the audio synthesizing unit 20 is also connected to an external speaker 22 via the audio converter unit 21. Therefore the game sound played and synthesized on the audio synthesizing unit 20 is decoded to analog signal on the audio converter unit 21 and output from the speaker 22.

A wireless communication control unit 23 includes a 2.4 GHz wireless communication module. The wireless communication control unit 23 is wirelessly connected to a controller 24 that is an accessory for the game console 2, and both send and receive data mutually. Users can input signal to the game console 2 by manipulating an operating device (not illustrated) such as a controller button on the controller 24. Therefore users can operate player characters displayed on the monitor 19 with controller 24. The game console 2 is connected to the communication network such as internet or LAN via a network interface 25. In other words, the game console 2 is communicable with a second game console 2 or a game server 3 through the network interface 25. By connecting the first game console 2 and the second game console 2 via communication network sending and receiving data mutually, the first game console 2 can synchronize the game and display the plurality of player characters in the same virtual game space in synchronization with second game console 2. Therefore, a multi-player game that the plurality of users cooperatively progresses the game works.

Configuration of a Game Console

Figure 2:
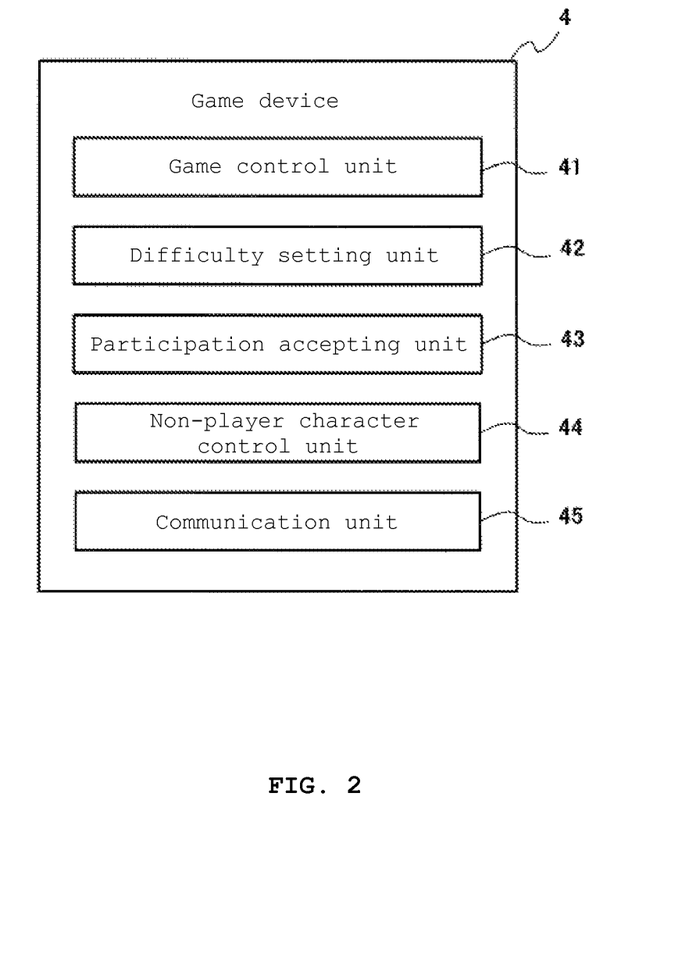
FIG. 2 is a block diagram illustrating a functional configuration of a game console illustrated in FIG. 1.

FIG. 2 is a block diagram illustrating a functional configuration of a game console 2 illustrated in FIG. 1. As illustrated on FIG. 1, the game console 2 functions as a computer containing a game device 4 including the CPU 10, the HDD 14, the ROM 15, the RAM 16, the graphic processor 17, the video converter unit 18, the network interface 25, etc. As illustrated on FIG. 2, the game device 4 in the game console 2 makes a game control unit (game control module) 41, a difficulty setting unit (difficulty setting module) 42, a participation accepting unit (participation accepting module) 43, a non-player character control unit (non-player character control module, NPC control unit) 44, a communication unit (communication module) 45, etc. function by executing the game program 30a.

The game control unit 41 controls progress of the game. The game control unit 41 controls actions of characters in the virtual game space correspondingly to operation input on computers by at least one of uses (hereinafter first user). At the same time, the game control unit 41 generates and displays the virtual game space and the characters on the monitor 19. For example, the game control unit 41 loads the data such as objects and textures that is included in the game data 30b and generates a Three Dimensional (3D) virtual game space as a player character moves. Furthermore, the game control unit 41 generates Two Dimensional (2D) image of the 3D virtual game space taken by a predetermined virtual camera for displaying on the monitor 19. Then, the game control unit 41 controls actions of characters in the virtual game space correspondingly to operation input on the controller 24 by the first user or progress of the game.

The difficulty setting unit 42 sets difficulty selected by each user for characters corresponding to each user before the game starts. The Participation accepting unit 43 accepts a user (second user) different from the first user joining the game. "The game" in the embodiment of the present invention includes a plurality of stages, and the Participation accepting unit 43 accepts the second user joining on each stage. The participation accepting unit 43 may accept participation of the second users during the first user's playing the game. In one embodiment of the present invention, it is disclosed that the first user and the second user join the same game. Also, one embodiment of the present invention disclosed bellow can be applied to the case of the three or more users joining the same game.

The NPC control unit 44 controls actions of a non-player character acting against the player character operated by each user in the virtual game space. In one embodiment of the present invention, the non-player character is an enemy character attacking the player character operated by each user.

The communication unit 45 in a first computer operated by the first user sends and receives the data so as to progress the game synchronously between the first computer and a second computer operated by the second user joining the game. The participation accepting unit 43 accepts the second user joining the game. A second player character corresponding to the second user is controlled by the game control unit 41, and controlling information is sent to the first computer through the communication unit 45. The first computer reflects the controlling information received in actions of the second player character in the same game space.

In one embodiment of the present invention, the game includes a plurality of stages. The participation accepting unit 43 accepts the second user to join the game before each of the stage stars. The game may be configured to complete a plurality of stages in predetermined order following predetermined scenario, for example. The game may be further configured to change a next stage to progress accordingly to stage selection of users or satisfaction of predetermined condition. Therefore, the embodiment of the present invention may be applied to the game whose scenario is forked.

The participation accepting unit 43 creates sessions that the plurality of users can join on each stage. The session is an area connected communicably between the first computer and the second computer. The session may be created on, for example, the network server on communication path between the first computer and the second computer or either one of computers. In one embodiment of the present invention, the session created by a host player (either one of the first or the second user who has created the session) is configured by being joined by a guest player (either one of the first or the second user who has not created the session). On the stage created by the host player, the first and the second user are able to progress the game in the same game space.

Figure 3:
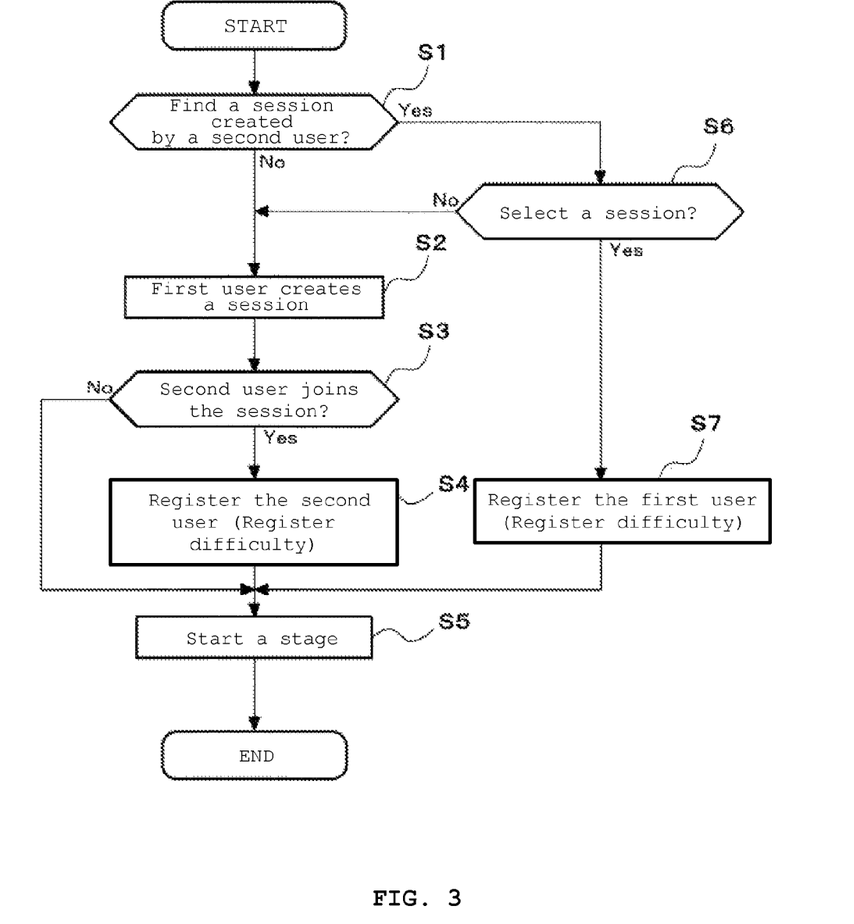

One embodiment of participation process of users is disclosed as bellow. FIG. 3 is a flowchart illustrating a process for participation to a session according to the present invention. FIG. 3 is illustrated based on a first computer operated by a first user. Step 1 (S1): when the first user starts the game, the communication unit 45 accesses to a second computer or a network server and searches the session created by a second user on a stage loaded first. Similarly, after a previous stage, the communication unit 45 accesses to the second computers or network server and searches the session created by the second user on a stage loaded next.

Step 2 (S2): when the session created by the second user is not existed (S1 of FIG. 3: No), the participation accepting unit 43 newly creates the session that the first user join. Then the first user becomes a host player. Step 3 (S3): On the condition above, the participation accepting unit 43 stays in the state that the second user can join the session created by the host player for a predetermined period. In one embodiment, the participation accepting unit 43 determines whether the signal to join the session is sent from the second computer operated by the second user.

Step 4 (S4): when the second user joins the session for a predetermined period (S3 of FIG. 3: Yes), the participation accepting unit 43 receives information sent from the second computer joining the session. Then the participation accepting unit 43 loads and records the information on the first computer. In this case, the second user becomes a guest user. The information includes such as DIFFICULTY and parameters set for a second character corresponding to the second user. The parameters are figures indicating ability of characters, for example attack value, defense value, dodge, etc. Such parameters are changed correspondingly to change of the DIFFICULTY. In one embodiment, each parameter may be multiplied by coefficient corresponding to the DIFFICULTY, or the parameters set for every DIFFICULTY may be loaded correspondingly to the DIFFICULTY. Also, such parameters set for a non-player character that is an enemy character. The parameters of the enemy characters are also changed by changing the DIFFICULTY. The step 3 and the step 4 are repeated when the plurality of second users join the session created by the first user.

The participation accepting unit 43 accepts not only the second user setting same DIFFICULTY as a first character operated by the first user, but also the second user setting different DIFFICULTY from the first character. In other word, the participation accepting unit 43 does not determine whether accepting users correspondingly to the DIFFICULTY set for player characters operated by the users. So to say, the participation accepting unit 43 accepts the users playing in every DIFFICULTY.

The game control unit 41 individually sets the parameters of the plurality of characters operated by the plurality of users joining the same session correspondingly to the DIFFICULTY set for each character. "DIFFICULTY" indicates how difficult to complete games. The DIFFICULTY is selected by users before the game starts. For example, the DIFFICULTY includes AMATEUR, NORMAL, VETERAN, PROFESSIONAL, etc. in order of easiness. For example, the easier the DIFFICULTY set, the higher the prime parameter values of player characters and the harder the DIFFICULTY set, the lower the prime parameter values. And/Or, when parameter values increase with increasing experience points, the easier the DIFFICULTY set, the larger the parameter increased values, and the harder the DIFFICULTY set, the smaller the parameter increased values increased. For example, the easier the DIFFICULTY set, the lower the parameter values of enemy characters get, so the enemy characters become weaker. On the contrary, the harder the DIFFICULTY set, the higher the parameter values of the enemy characters get, so the enemy characters become stronger. After the DIFFICULTY is selected at the time before the game or starting the game, the DIFFICULTY may not be changed during the session (main game). At the time starting the game may include not only the time before the first stage of continuous scenario having the plurality of stages but also the time before every stage starts individually. In one embodiment, the DIFFICULTY can be set for each stage. Also in this case, after the DIFFICULTY set, the DIFFICULTY may not be changed during the game. In addition, when the second user break in the middle of the stage progressed by the first user, the start of the game for the second user on the game console 2 is when starting the participation process in the middle of the game, for example when matching the session.

In one embodiment, "LEVEL" or "RANK" as parameters deciding the ability of players and enemy characters may be applicable additionally to "DIFFICULTY". These parameters such as "LEVEL" and "RANK" are different from the "DIFFICULTY" that is changed during the scenario in the game. "LEVEL" and "RANK" are changed correspondingly to actions (behavior) of player characters in the game.

"LEVEL" is increased by actions (behavior) of the player characters in the game. And, "LEVEL" indicates how the player character growing numerically. For example, each time the player character defeats the enemy character, getting experience points corresponding to the parameters of the enemy character. When the player character obtains the experience points and sum of the experience points reach to predetermined point to be promoted, LEVEL of the player character becomes to the next LEVEL. In every promotion of the LEVEL, the parameters of the player character is increased, and the user can play the game advantageously "RANK" is figures increased and decreased by actions (behavior) of the player characters in the game. For example, when the player character damage the enemy character, RANK calculating points are increased by the predetermined points corresponding to damage value or types of damage that the enemy character gets from the player character. When the player character is damaged, the RANK calculating points are decreased correspondingly to damage value or types of damage the player character gets from the enemy character. The RANK is promoted when the RANK calculating points in total reach higher than predetermined, and demoted when the RANK calculating points in total is lower than predetermined. For example, ranges of the RANKs may be set 0-2 for the AMATEUR DIFFICULTY, 3-7 for the NORMAL DIFFICULTY, 5-9 for the VETERAN DIFFICULTY, and 8-10 for the PROFESSIONAL DIFFICULTY. According to the above, how much the player character promote the RANK on the NORMAL DIFFICULTY, the game does not get harder than predetermined the RANK on the VETERAN DIFFICULTY, for example. Also, the RANK may be set for the RANK predetermined for each stage correspondingly to the DIFFICULTY before the stage starts. In the embodiment above, the ranges of the RANKs are overlapped on a plurality of difficulties. However, one embodiment of the present invention is not so limited, and also the ranges of the RANKs are not necessarily overlapped on a plurality of difficulties. For example, even when the RANK has been promoted to maximum on the NORMAL DIFFICULTY, may not be the same RANK on the VETERAN DIFFICULTY. Not only the plurality of RANKs may be set for each DIFFICULTY, but one RANK may be set for one DIFFICULTY.

Thus, the LEVEL and the RANK are changed in the middle of the session, but DIFFICULTY is not. In one embodiment of the present invention, the player characters operated by the plurality of users and set difficulties individually can take part in the same session. Then, in the game that the plurality of users takes part, opportunity of matching increases. Especially, in such games that the sessions are created on each stage, the present invention could reduce such situation as that no user can take part in the session. The present invention could be more effective in such games that the stages to join are limited by the progress of users.

Step 5 (S5): after the second user joining the session created by the first user is registered, the game control unit 41 in the first computer places the plurality of second player character joining the session in the virtual game space and starts the game on the stage. The game control unit 41 in the computers controls actions of the correspondent characters correspondingly to operation input by each user.

Step 5: also, when no user joins the session created by the first user (step 3 of FIG. 3: No), only the first user starts the game on the stage. In such case, the game control unit 41 may place non-player characters instead of the second player character that is acting corporately with the first character in the virtual game space. The NPC control unit 44 controls actions of the non-player character placed in the virtual game space.

In S1, when the session has already created by the second user (S1 of FIG. 3: Yes), the communication unit 45 accesses to the second computer or the network server on that the session is created and loads the list (data) of the session to participate. The list of the session to participate is displayed on the monitor 19 connected to the game console 2 Information relating to the second user such as the name of character, the LEVEL, and DIFFICULTY is on the list.

When the first user finds the desired session in the list, selects the session and applies to join the session (S6 of FIG. 3: Yes) The communication unit 45 in the first computer accesses to the second computer or the network server of the second user creating the session and sends the signal to join the session. Step 7 (S7): the communication unit 45 sends information including the DIFFICULTY set for and parameters of the first player character to the second computer creating the session. And the second computer registers the information. Then, the second user becomes the host player and the first user becomes the guest player.

When the second computer creating the session receives too many applications simultaneously, the computers of users who cannot join the session may search the session to join. In the games that the second computer creating the session may decline the request for joining the session from users, computers of users declined the request may search the session to participate again.

Step 5 (S5): after registering the information of the first user joining the session created by the second user to the second computer, the game control unit 41 in the second computer places the plurality of player characters joining the session in the virtual game space and starts the session on the stage.

When the desired session for the first user is not on the list (S6 of FIG. 3: No), the participation accepting unit 43 newly creates the session (S2), and the first user become a host player. Then, the participation process disclosed above as S2 to S5 is executed.

Figure 4:
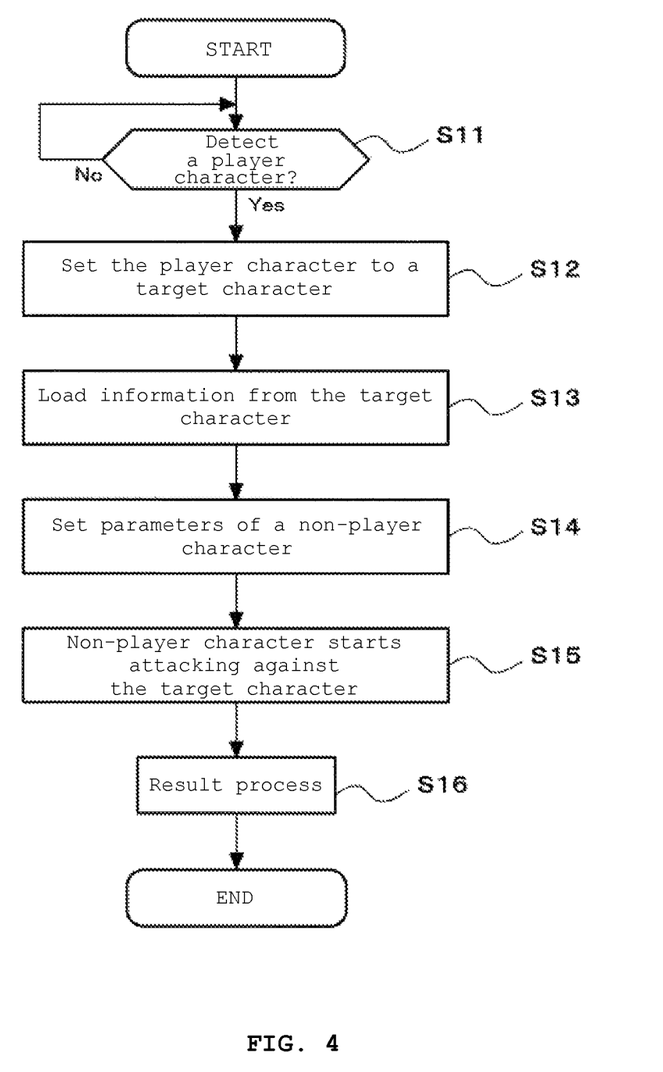
FIG. 4 is a flowchart illustrating a process for controlling attacking actions of enemy characters against a player character

In the embodiment disclosed above, different difficulties may be set for each player character correspondingly to the plurality of users individually. It is disclosed that the process of controlling the non-player characters (enemy characters) acting against the player characters when the plurality of player characters set mutually different difficulties joins in the same session. FIG. 4 is a flowchart illustrating a process for controlling actions of enemy character attacking against a player character.

In a process for controlling attacking actions of the enemy character, The enemy character is placed at predetermined area in the virtual game space when the stage starts. Then, the NPC control unit 44 controls the enemy characters to act as determined. Step 11 (S11): the NPC control unit 44 determines whether the enemy character detects the player characters satisfying predetermined conditions at prescribed timings, for example at every predetermined flame. In one embodiment, the NPC control unit 44 determines whether the player character comes into the area preset on enemy characters (detectable area) at prescribed timings, for example at every predetermined flame. Then, the NPC control unit 44 determines whether the player character coming in to the detectable area satisfies the predetermined conditions. When the player character comes into the detectable area alone, the player character may satisfy the predetermined conditions. Also, when the plurality of characters comes into the detectable area, the player character that is closest to the enemy character may satisfy the predetermined conditions. And/Or, the player character whose hated value accumulated during the game is highest may satisfy the predetermined condition. The hated value is accumulated on each player character correspondingly to the total damages and times of attacks that the player character has given to the enemy character, for example. And/Or, the player character whose predetermined Attack Target Priority (status such as how damaged) is higher may satisfy the predetermined condition. The predetermined condition may be set by combining the plurality of conditions described above with deciding priority. Furthermore, when non-player characters (supporting characters) cooperates with the player character, the NPC control unit 44 controls actions of supporting characters to act against enemy character similarly to the player character. Accordingly the description controlling actions of supporting characters is omitted.

Step 12 (S12): when the enemy character detects the player character satisfying the predetermined conditions in the detectable area (S11 of FIG. 4), the NPC control unit 44 set the player character to the target character for the enemy character. Step 13 (S13): the NPC control unit 44 loads information of the player character set for the target character. The loaded information includes such as the DIFFICULTY and the RANK of the player character. In addition, the NPC control unit 44 may load parameters such as attack value, defense value, dodge of the player character.

Step 14 (S14): The NPC control unit 44 set the parameters of the enemy character based on the loaded information of the target character. In one embodiment, the parameters of the enemy character may be set as bellow. The higher the DIFFICULTY or the RANK of the target character (player character) is, the more disadvantageous the target character gets. And, the lower the DIFFICULTY or the RANK of the target character is, the more advantageous the target character gets.

In one embodiment, the higher the DIFFICULTY or the RANK of the target character is, the higher each parameter such as attack value, defense value, dodge, quickness, or speed of the enemy character is set. And, the lower the DIFFICULTY or the RANK of the target character is, the lower each parameter of the enemy character is set. When the DIFFICULTY or the RANK of the target character is higher than predetermined, attacks of the enemy character may be set stronger. In one embodiment, the higher the DIFFICULTY or the RANK of the target character is, the lower the appearance ratio of experience point and recovery item after defeating the enemy character is set. And, the lower the DIFFICULTY or the RANK of the target character is, the higher the appearance ratio is set. Or, when the DIFFICULTY or the RANK of the target character is lower than predetermined, more valuable item may appear.

Step 15 (S15): after the parameters of enemy character are set, the NPC control unit 44 controls the enemy character to act against the target character. Step 16 (S16): the game control unit 41 executes a result process (acting result process) based on actions of the target character and the enemy character. The acting result process includes the process damaging a character (e.g. enemy character) when attacks of another character (e.g. player character) hits or appearing item in predetermined ratio when the health point of the enemy character becomes 0. The damage value is calculated on the basis of each parameter corresponding to the DIFFICULTY set for the character as described above. A process of appearing item when having defeated the enemy character is not necessarily synchronized among computers operated by the plurality of users. Then, item is made to appear only for the player character set the DIFFICULTY lower. Otherwise, no item or less valuable item is made to appear for the player character set the DIFFICULTY higher.

When the enemy character is attacked by a first player character excepting the target character, the NPC control unit 44 resets the parameters of the enemy character on the basis of the difficulty set for the first player character attacking and calculates the damage value on the enemy character. When the first player character excepting the target character is attacked and damaged by the enemy character, the NPC control unit 44 resets the parameters of the enemy character on the basis of the difficulty set for the first player character attacked and calculates the damage value on the first player character.

The NPC control unit 44 changes the target character correspondingly to actions of the player character and/or the enemy character. When the first player character in the detectable area is preferable or more suitable for the conditions for the enemy character than a second player character that is a present target character, the NPC control unit 44 releases the second player character from the target character and sets the first player character as the target character. Then the NPC control unit 44 executes the step S13 to S16. In one embodiment, in the case of such as: the first player character is closer to the enemy character; the hated value of the first player character in the detective area is higher; or the attack target priority (status such as how damaged) of the first player character in the detective area is higher than the second player character that is the present target character; the target character is taken over.

Thus, the NPC control unit 44 sets the target character from the plurality of characters corresponding to the plurality of the users in the middle of the game. The NPC control unit 44 controls changing parameters of the enemy character correspondingly to the difficulty set for the target character. The parameters of the enemy character are changed when the target character is taken over. Therefore, difficulty to defeat the enemy character varies correspondingly to the difficulty set for each player character, though the enemy character is the same. In one embodiment, even if parameters are exactly the same, the difficulty is higher, the damage on the enemy character is lower, and the damage on the player character from the enemy character is higher. Therefore, as the difficulty set for the player character gets higher, defeating the enemy character gets harder.

When technical gaps are big among the plurality of users, high technic users tend to support low technic users. The low technic users might feel beholden to the high technic users for supporting. Additionally, when parameters of the enemy characters set fixed without correspondingly to the difficulty set for each player character, and technical gaps are big among the plurality of users, every user might not be satisfied with the game.

In one embodiment of the present invention, when the plurality of player characters whose parameters excepting difficulty are same attacks the same enemy character, the damage on the enemy character and the damage from the enemy character are changed correspondingly to each difficulty. Thus, even the high technic users have tougher game than the low technic users. Therefore, the low technic users may also support the high technic users. Consequently, users may be satisfied with the game by cooperating each other without depending on user's technic.

The present invention may be improved, changed, and modified without departing from the broader spirit and scope of the invention and not intended to be limited to the particular one embodiment (forms) disclosed above.

For example, in the particular embodiment disclosed above, NPC control unit 44 sets (changes) parameters of the enemy character based on the loaded information including difficulty set for the target character. Additionally or otherwise, NPC control unit 44 may set (change) parameters of the target character based on the loaded information including difficulty set for the target character. For example, each parameter such as attack value, defense value, dodge, quickness, or speed of the enemy character may be set lower, as the difficulty or the RANK of the target character is set higher. On the contrary, each parameter such as attack value, defense value, dodge, quickness, or speed of the enemy character may be set higher as the difficulty or the RANK of the target character is set lower.

The embodiment according to the present invention is disclosed specifically in the games progressed by the plurality of player characters cooperatively defeating the enemy characters. However, the present invention is not limited to such games but also applicable to the game that the plurality of player characters achieves predetermined objectives in the virtual game space. In one embodiment, the present invention can be applicable to such games as the plurality of player characters compete on speed of defeating predetermined enemy characters.

The particular embodiment above is disclosed specifically in the form of online games as the plurality of player characters are made to act cooperatively together. In the online games, the plurality of player characters corresponding to the plurality of users individually operating the plurality of different computers is made to appear in the virtual game space, and the plurality of computers are connected on the network. Also, the present invention can be applied to such offline games that the plurality of users inputs operation to one computer. In the offline games, the plurality of player characters correspondingly to the plurality of users is made to appear in the virtual game space.

The particular embodiment is disclosed in the form of such stationary game consoles. However, the present invention can be applied to mobile game consoles, mobile phones, personal computers, etc.

INDUSTRIAL APPLICABILITY

The present invention may be improved, changed, and modified without departing from the broader spirit and scope of the invention and not intended to be limited to the particular embodiments (forms) disclosed above.

REFERENCE SIGNS LIST 2 game console
30 disc-type storage medium
30a game program
30b game data
41 game control unit (game control module)
42 difficulty setting unit (difficulty setting module)
43 participation accepting unit (participation accepting module)
44 non-player character control unit (non-player character control module)
45 communication unit (communication module)

The invention claimed is:

1. A game system comprising:
a game control module for generating a virtual game space in a game and processing the game by making a first character act correspondingly to an operation input by a first user who is joining the game;
a difficulty setting module for setting a first difficulty for the first character operated by the first user before the game starts;
a participation accepting module for accepting a request from a second user operating a second character different from the first character for joining the game, the second user setting a second difficulty for the second character in joining the game, the second difficulty being different from the first difficulty, the participation accepting module allowing the second user to join the game; and
a non-player character control module for controlling actions of a non-player character attacking the first and second characters;
the non-player character control module setting a target character chosen from the first and second characters and changing parameters of the non-player character to change attacking ability thereof based on the first difficulty when the first character is chosen as the target character, or based on the second difficulty when the second character is chosen as the target character.

2. The game system according to claim 1 further comprising:
a communication module for sending and receiving data so as to synchronize the game between a first computer and a second computer operated by the first user and the second user respectively;
wherein the participation accepting module allows the second user to join the game,
each of the first and second characters is arranged to accumulate hate value on the basis of the number of times of attacking the non-player character and on the basis of damages caused by attacking the non-player character, and
the first character is chosen as the target character, when the hate value of the first character is larger than the hate value of the second character.

3. A method of controlling a game system, comprising:
a step of game control for generating a virtual game space in a game, and processing the game by making a first character act correspondingly to an operation input by a first user who is joining the game;
a step of difficulty setting for setting a first difficulty for the first character operated by the first user before the game starts; and
a step of participation accepting for accepting a request from a second user operating a second character different from the first character for joining the game, the second user setting a second difficulty for the second character in joining the game, the second difficulty being different from the first difficulty, the step of participation accepting allowing the second user to join the game; and
a step of non-player character control for controlling actions of a non-player character attacking the first and second characters,
the step of non-player character control including a step for setting a target character chosen from the first and second characters and a step for changing parameters of the non-player character to change attacking ability thereof based on the first difficulty when the first character is chosen as the target character, or based on the second difficulty when the second character is chosen as the target character.

4. The method of controlling the game system according to claim 3, further comprising:
a step of communication for sending and receiving a data so as to synchronize the game between a first computer and a second computer operated by the first user and the second user respectively,
wherein the step of participation accepting includes a step of allowing the second user to join the game, and
each of the first and second characters is arranged to accumulate hate value on the basis of the number of times of attacking the non-player character and on the basis of damages caused by attacking the non-player character, and
the first character is chosen as the target character, when the hate value of the first character is larger than the hate value of the second character.

5. A non-transitory computer-readable storage medium storing a program for causing a computer to execute a process, the process comprising:
a step of game control for generating a virtual game space in a game, and processing the game by making a first character act correspondingly to an operation input by a first user who is joining the game;
a step of difficulty setting for setting a first difficulty for the first character operated by the first user before the game starts; and
a step of participation accepting for accepting a request of a second user operating a second character different from the first character for joining the game, the second user setting a second difficulty for the second character in joining the game, the second difficulty being different from the first difficulty, the step of participation accepting allowing the second user to join the game, and
a step of non-player character control for controlling actions of a non-player character attacking the first and second characters,
the step of non-player character control including a step for setting a target character chosen from the first and second characters and a step for changing parameters of the non-player character to change attacking ability thereof based on the first difficulty when the first character is chosen as the target character, or based on the second difficulty when the second character is chosen as the target character.

6. The non-transitory storage medium according to claim 5, further comprising:

a step of communication for sending and receiving data so as to synchronize the game between a first computer and a second computer operated by the first user and the second user respectively, wherein the step of participation accepting includes a step for accepting the request for joining the game from the second user, and each of the first and second characters is arranged to accumulate hate value on the basis of the number of times of attacking the non-player character and on the basis of damages caused by attacking the non-player character, and the first character is chosen as the target character, when the hate value of the first character is larger than the hate value of the second character.

\* \* \* \* \*